Patented Feb. 14, 1950

2,497,311

UNITED STATES PATENT OFFICE 2,497,311

(5-CHLORO-2-THENOYL)-o-BENZOIC ACID

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,665

1 Claim. (Cl. 260—329)

This invention relates to the preparation of (5-chloro-2-thenoyl)-o-benzoic acid of the formula:

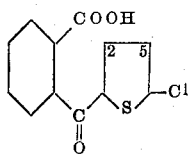

The invention has for its object the preparation of a new intermediate suitable for further condensation or reaction, particularly in the preparation of new dyestuffs. A further object of the invention is to provide a commercially feasible process for the preparation of this new chemical compound.

This product is a valuable intermediate for use in organic synthesis and is of special importance as a dyestuff intermediate because it can be readily ring-closed to the 2-chlorothiophanthraquinone, as more particularly described in my copending application Serial No. 723,667.

This (5-chloro-2-thenoyl)-o-benzoic acid may be obtained in good yields by condensing alpha-chlorothiophene with phthalic anhydride in nitrobenzene and in the presence of aluminum chloride when the reaction is carried out at temperatures above 50° C.

The following example is given to illustrate a preferred process for preparing this compound.

Example 1

30 parts of aluminum chloride and 15 parts of phthalic anhydride were dissolved in 90 parts of nitrobenzene and heated to 75° C. A solution of 12 parts of alpha-chlorothiophene in 8 parts of nitrobenzene was added over a period of 15 minutes, while the mass was held at a temperature of from 75° to 80° C. After the HCl evolution had practically stopped, the reaction mass was poured into water and the nitrobenzene was removed by steam distillation. The crude reaction product was dissolved in 800 parts of water containing a slight excess of caustic soda over that required to neutralize the solution, and filtered. The filtrate was acidified with hydrochloric acid and the crystalline precipitate was filtered, washed and dried. 16.1 parts of crude (5-chloro-2-thenoyl)-o-benzoic acid, melting at from 128° to 130° C., was obtained, equal to a yield of 60.5% of theory. When 14.5 parts of this product was crystallized from a solvent mixture of 70 parts of benzene and 70 parts of gasoline, there were obtained 12.4 parts of (5-chloro-2-thenoyl)-o-benzoic acid melting at the constant melting point of 129° to 130° C.

While the specific process as above described may be varied, it has been found that the phthalic anhydride and the alpha-chlorothiophene may be employed in substantially equal molecular amounts and that from 10% to 15% in excess of 2 mols of aluminum chloride (AlCl₃) per mol of phthalic anhydride gives maximum yields of the desired product. The excess aluminum chloride is employed to assure complete condensation and to make up for any impurities which may be present therein. While other solvents customarily employed in the Friedel-Crafts reaction may be used, nitrobenzene has been found most satisfactory. The condensation temperatures may be varied, but temperatures below 50° C. adversely influence the yield, apparently due to polymerization of the chlorothiophene. Temperatures of from 70° to 90° C. have been found to give satisfactory results. The (5-chloro-2-thenoyl)-o-benzoic acid may be isolated and purified as described, or, where desired, it may be ring-closed in the nitrobenzene solution without isolation.

We claim:

(5-chloro-2-thenoyl)-o-benzoic acid.

HENRY R. LEE.
VIKTOR WEINMAYR.

REFERENCES CITED

The following references are of record in the file of this patent:

Thomas: "Anhydrous Aluminum Chloride," pages 526, 527, 540, Reinhold Pub. Co., 1941.

Steinkopf: "Die Chemie Des Thiophens," page 71, Dresden (1941).